United States Patent [19]

Foster et al.

[11] 4,266,831

[45] May 12, 1981

[54] WHEEL COVER

[75] Inventors: Edwin E. Foster; Thomas E. Foster, both of Austin, Tex.

[73] Assignee: Michael Ladney, Jr., Grosse Pointe Shores, Mich.

[21] Appl. No.: 50,108

[22] Filed: Jun. 19, 1979

[51] Int. Cl.³ .............................................. B60B 7/00
[52] U.S. Cl. .............................. 301/37 PB; 301/37 P
[58] Field of Search ............... 301/37 R, 37 P, 37 TP, 301/37 PB, 37 B; 220/319, 320; 292/256.6, 256.61, 256.63, 256.65; 24/73 HC

[56] References Cited

U.S. PATENT DOCUMENTS

| 2,038,871 | 4/1936 | Mueller et al. | 220/319 |
| 2,732,262 | 1/1956 | Buerger | 301/37 R |
| 2,746,805 | 5/1956 | Gamundi | 301/37 R |
| 3,181,915 | 5/1915 | Spisak | 301/37 B |
| 4,027,919 | 6/1977 | Foster et al. | 301/37 TP |

FOREIGN PATENT DOCUMENTS 629361  10/1961  Canada .................................. 301/37 R Primary Examiner—H. Grant Skaggs
Attorney, Agent, or Firm—Barnes, Kisselle, Raisch & Choate

[57] ABSTRACT

A wheel cover formed of plastic or metal having a wire ring supported on the inboard face thereof. The ring is formed with a plurality of circumferentially spaced, radially outwardly extending, U-shaped projections designed to frictionally engage an annular surface on the wheel rim to retain the cover thereon. The radially outermost portion of the bight section of each projection is formed with a sharp biting edge face inclined both to the plane of the wheel cover and to the axis of the wheel cover so as to provide substantial resistance of the cover to rotation and axial outward displacement relative to the wheel.

8 Claims, 9 Drawing Figures

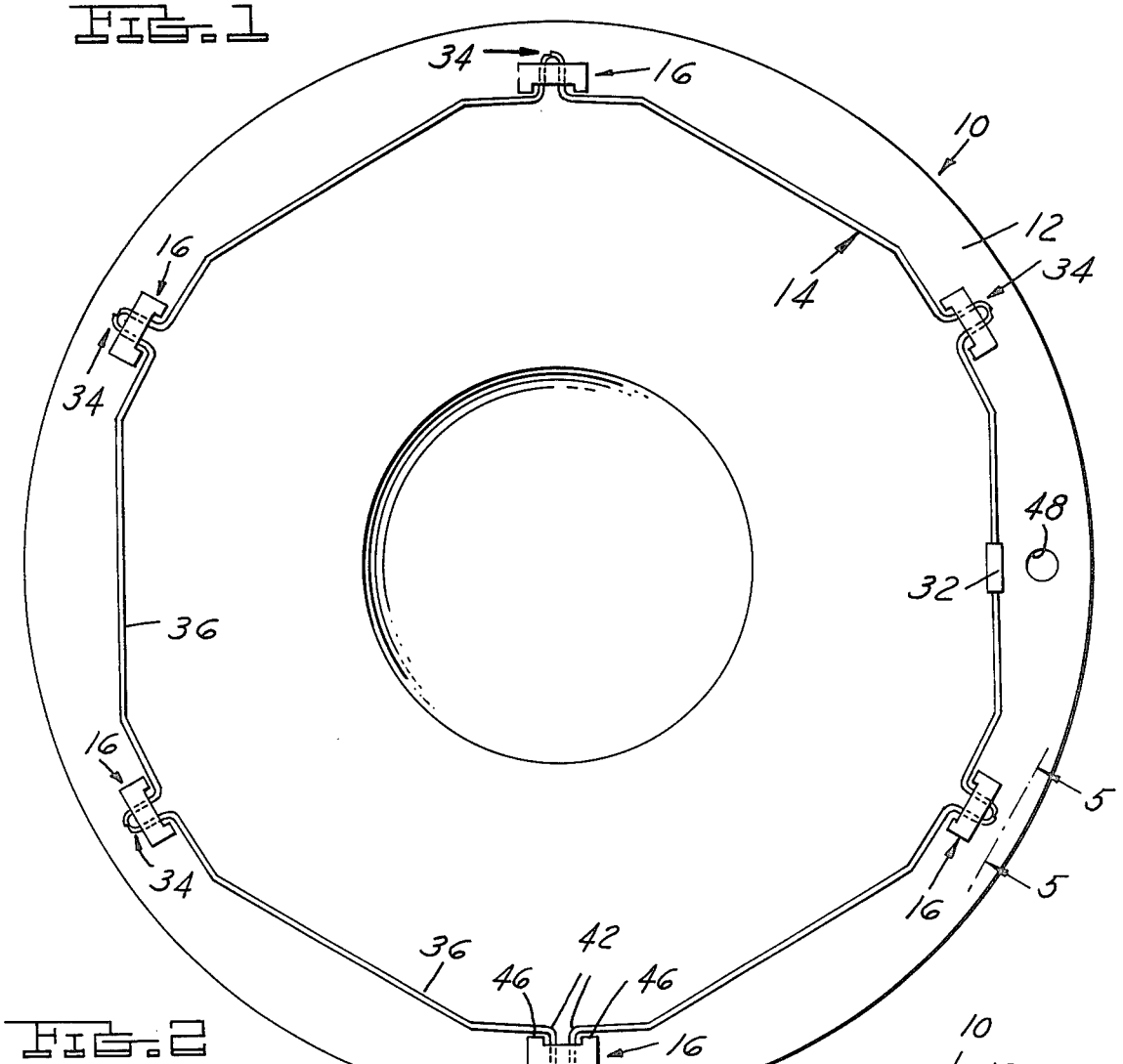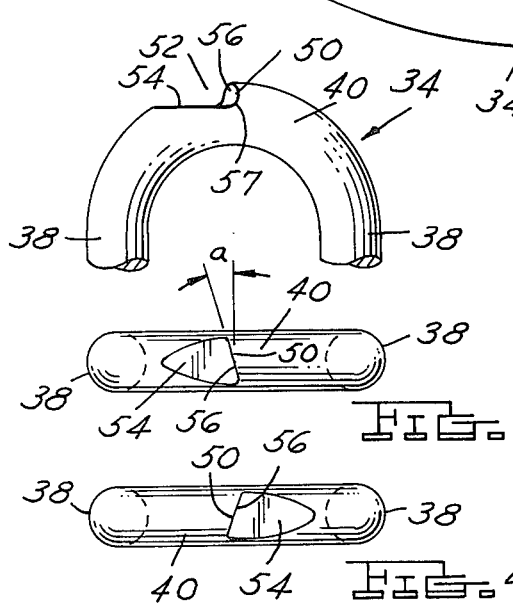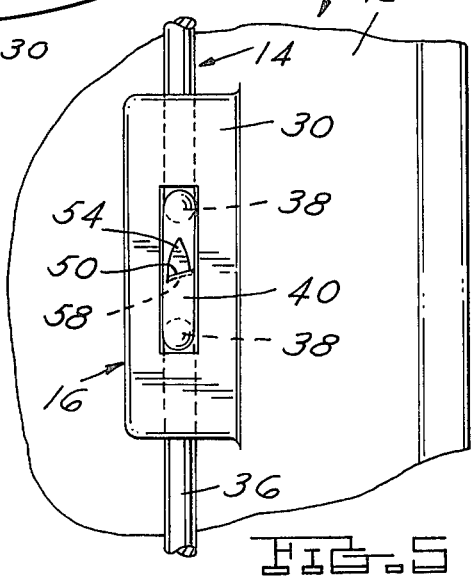

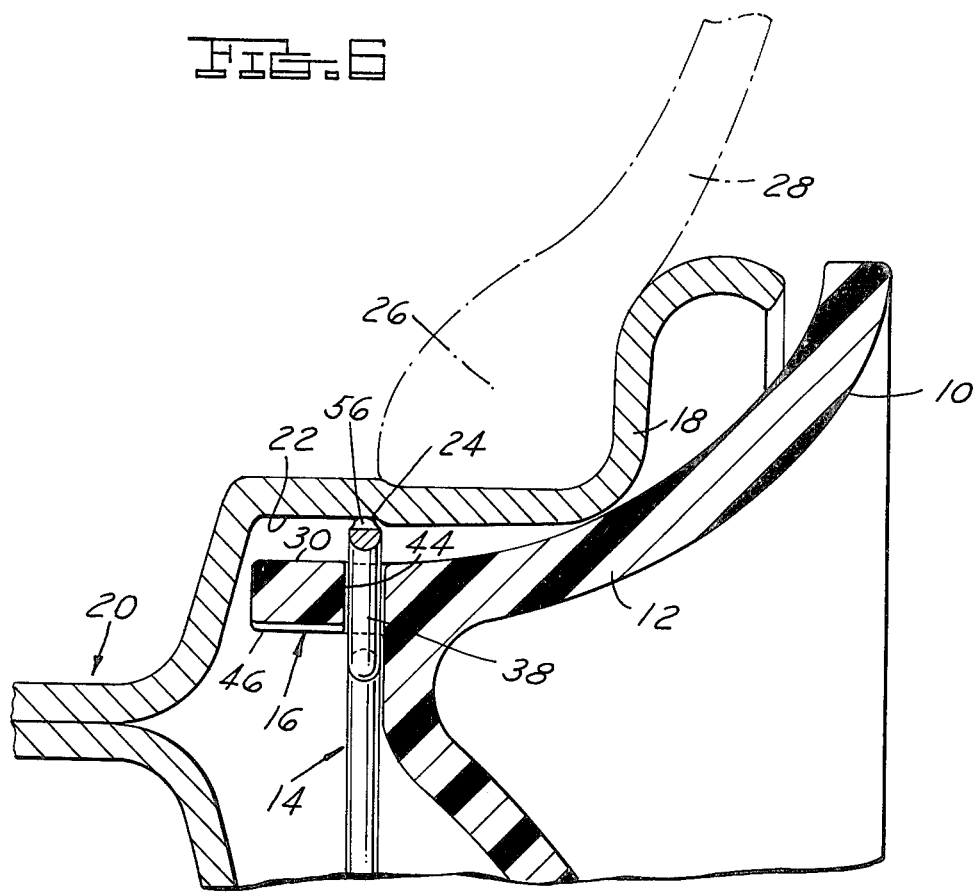
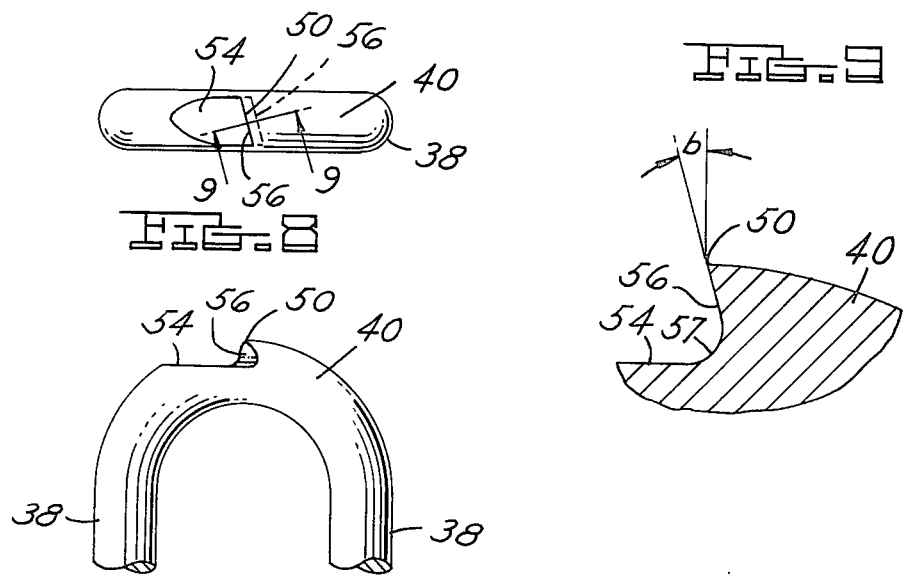
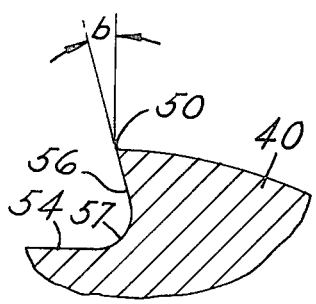

WHEEL COVER

This invention relates to vehicle wheel covers and, particularly, to an improved means for retaining the cover on a vehicle wheel.

In our prior U.S. Pat. No. 4,027,919 there is disclosed a wheel cover adapted to be mounted on a vehicle wheel by means of a resilient wire ring supported on the inboard face of the cover. The wire ring has a plurality of at least three radially outwardly extending projections around its periphery adapted to frictionally engage an annular surface on the wheel rim to retain the cover on the wheel. The cover is provided with a plurality of radial passageways having a close fit with the radial projections to permit radial movement of the projections within the guides. The portions of the wire ring intermediate the projections are radially flexible to permit radial displacement of the individual projections within the radial passageways while preventing radial displacement of the ring as a whole. This enables the cover to be tightly secured to a vehicle wheel in a manner such that the retention forces are substantially completely absorbed by the wire ring and are not transmitted to the body of the wheel cover. This feature is particularly important when the wheel cover body is fabricated from a readily distortable material such as plastic or thin sheet aluminum.

The wheel cover disclosed in the aforesaid patent has proven to be very successful in use. However, for reasons of extreme safety, some vehicle manufacturers have established specifications for torque and axial pull off resistance for wheel covers which are relatively high. The torque resistance is a measure of the force required to rotate the mounted cover relative to the wheel. The axial pull off resistance is a measure of the force required to displace the cover axially away and remove it from the wheel. The anti-torque requirement is deemed necessary to prevent the cover from shearing off the valve stem which projects through it. The pull off resistance requirement is deemed necessary to prevent the cover from being accidentally disengaged from a wheel when undergoing sharp cornering or encountering a sharp bump.

An increase in the required anti-torque and pull off forces for wheel covers normally requires an increase in the spring tension exerted between the cover retention means and the wheel. However, if this spring tension is substantially increased, then the force required to mount the cover on the wheel and to remove it from the wheel becomes exceedingly great, thus rendering this task more difficult and subjecting the cover to possible damage by distortion, fracture, etc.

The primary object of the present invention is to improve the anti-torque and pull off resistance of wheel covers of the type disclosed in the aforesaid patent without substantially increasing the force required to apply or remove the cover from the wheel. This object is achieved without increasing the spring tension exerted between the cover retention means and the wheel.

More specifically, it is an object of this invention to improve the anti-torque and pull off resistance of wheel covers of the type described by imparting a configuration to the outer ends of the projections on the spring retainer ring so that they more firmly frictionally engage the wheel rim. According to the present invention the projections on the resilient retaining ring are U-shaped wire sections and the radially outer side of the bight portion of each projection is formed at the center thereof with a sharp biting edge face inclined relative to a line parallel to the axis of the wheel. This biting edge face is inclined both to the plane of the wheel cover and to the axis of the wheel cover so as to simultaneously increase the resistance of the cover to both rotation and axial outward displacement relative to the wheel.

Other objects, features and advantages of the present invention will become apparent from the following description and accompanying drawings, in which:

FIG. 1 is a plan view of the inboard face of a wheel cover according to the present invention;

FIG. 2 is a fragmentary view of one of the U-shaped projections of the cover retaining ring;

FIG. 3 is an end view of one of the projections;

FIG. 4 is an end view of another projection;

FIG. 5 is a fragmentary sectional view taken along the line 5—5 in FIG. 1;

FIG. 6 is a fragmentary sectional view illustrating the manner in which the wheel cover is retained on a wheel;

FIG. 7 is an end view of a projection on the retaining ring of modified construction;

FIG. 8 is a fragmentary side elevational view of the projection shown in FIG. 7; and FIG. 9 is a fragmentary sectional view taken along the line 9—9 in FIG. 7.

The wheel cover 10 illustrated in FIGS. 1 and 6 includes a plastic molded body portion 12 having a wire ring 14 mounted on the inboard face thereof by means of a plurality of supports 16 molded integrally with the body portion. Cover 10 is adapted to be mounted on the rim 18 of a wheel 20. More specifically, rim 18 is fashioned with a radially inwardly facing annular safety groove 22, the axially outer side of which is defined by a rounded shoulder 24. This shoulder 24 forms a stop for the bead 26 around the inner peripheral edge of a tire 28.

The cover illustrated in FIG. 1 has a plurality of six supports 16 which are equally spaced circumferentially around the outer periphery thereof. The radially outer surfaces 30 of supports 16 define a circle which is of slightly less diameter than the portion of the rim adjacent and axially outwardly of safety groove 22.

Ring 14 comprises a single length of wire of circular cross section having its opposite ends secured together by a bushing 32. The ring 14 is formed with six radially outwardly extending, U-shaped projections 34 which are interconnected by circumferentially extending spring sections 36. Each U-shaped projection 34 comprises a pair of generally parallel, radially outwardly extending legs 38 connected at their outer ends by a bight portion 40 in the form of a return bend. Legs 38 extend generally radially of the cover and are connected to spring elements 36 by sharp bends 42. Ring 14 is arranged on the cover with the U-shaped projections 34 extending radially outwardly through passageways 44 in supports 16. The legs 38 of projections 34 have a relatively close fit with the walls of passageways 44 and the return bends 40 of the projections project slightly beyond the radially outer surfaces 30 of supports 16.

As explained in our prior patent, when ring 14 is assembled with the cover as shown in FIG. 1 it is in an unstressed condition and the sharp bends 42 are located at least slightly radially inwardly from the radially inner face portions 46 of supports 16. The circle defined by the outer ends of projections 34 has a diameter slightly greater than the diameter of safety groove 22. To mount the cover on the wheel it is placed against the outboard face of the wheel with the valve stem on the wheel projecting through the valve stem opening 48 on the cover. The cover is inclined to the face of the wheel so that the two projections 34 next adjacent the opposite sides of valve stem opening 48 engage in the safety groove 22 on the wheel rim. Thereafter the portion of the cover diametrically opposite the valve stem opening 48 is pushed inwardly against the outer face of the wheel. This causes the outer ends 40 of the remaining projections 34 to be displaced radially inwardly by reason of the flexibility of the spring portions 36 so that the outer ends 40 of all of the projections are engaged in the safety groove 22 adjacent shoulder 24 as shown in FIG. 6. As clearly described in the aforesaid patent, the cover is thus firmly retained on the wheel and the forces generated by the radial inward movement of projections 34 are completely absorbed by the interconnected spring elements 36 and none of these forces is transmitted to the cover itself.

From the above description it follows that the retention forces developed in the retainer ring 14 depend upon the diameter of the circle formed by the outer ends 40 of projections 34 relative to the diameter of safety groove 22. As the diameter of the outer ends of the projections 34 increases relative to the diameter of the safety groove the retention forces become greater. However, if these retention forces become greater by reason of the tension in wire ring 14, it also becomes more difficult to apply the cover to the wheel and to remove it from the wheel. If the circle defined by the outer ends of projections 34 is of excessively large diameter in relation to the diameter of safety groove 22, then it becomes almost impossible to apply the cover to the wheel or to remove it from the wheel without damaging the cover in some fashion.

With the cover of the present invention this problem is avoided by providing sharp biting edges 50 at the radially outermost portions of the return bends 40 on each projection 34. The biting edges 50 are provided by cutting away or otherwise removing a portion of the wire at the extreme outer ends of the return bends 40 so as to provide a notch 52 therein. Each notch 52 is defined by a generally flat, axially extending face 54 and a generally radially extending flat face 56 which intersect with a generous radius 56a. The notches 52 can be formed by shearing, grinding, broaching, etc. The sharp biting edge 50 is defined by the line of intersection between the flat face 56 and the outer surface of the wire. As clearly illustrated in FIGS. 3 and 4, the flat faces 56 are inclined to the axis of the wheel cover at a slight angle $a$ of between 10° to 20° and preferably about 15°. Likewise, as shown in FIGS. 3 and 4, on some of the projections the flat face 56 inclines in one direction relative to the axis of the cover and on other projections the flat face 56 inclines in the opposite direction to the axis of the wheel cover to the same extent. The oppositely inclined faces 56 are also formed so that they face in opposite circumferential directions. Preferably the inclination of the flat faces 56 are opposite one another on the circumferentially adjacent projections 34.

It will be appreciated that the oppositely facing sharp biting edges 50 have a tendency to dig into the safety groove 22 and thus resist rotation of the wheel cover relative to the wheel in both directions. At the same time, since these biting edges 50 are inclined slightly to the axis of the wheel cover, they engage the shoulder 24 of the safety groove and tend to dig into the shoulder in response to displacement of the cover axially outwardly from the wheel. As soon as one of the projections 34 tend to ride over the shoulder 24, the biting edge 50 thereon digs into the shoulder and resists displacement of the cover in an axially outward direction. Thus, the oppositely inclined biting edges 50 substantially increase the anti-torque and the pull out resistance of the cover relative to the wheel.

In the embodiment illustrated in FIGS. 1 through 6 the flat faces 54,56 are perpendicularly related. If desired, the anti-torque and pull off resistance can be increased to an even greater extent by inclining face 56 to face 54. Thus, as shown in FIG. 9, when face 56 is inclined to a radial plane at an angle $b$ (preferably on the order of 5° to 15°), the apex of the biting edge 50 will have an inclined angle of 75° to 85° with the outer surface of the wire and a greater tendency to more readily dig into the safety groove 22 in response to a force tending to rotate the cover relative to the wheel or to displace the cover radially outwardly from the safety groove 22. In other respects the shape of the projections 34 shown in FIGS. 7 through 9 is substantially the same as in the previous embodiment described.

The notches 52 illustrated in the drawings are shown of somewhat exaggerated depth. It will be under stood that the notches 52 are sufficiently shallow as to not substantially diminish the strength of the wire. The notches 52 should have a depth substantially less than one-half the diameter of the wire. Experience has shown that where the wire diameter of retainer ring 14 is about 0.099" the biting edges 50 provide excellent anti-torque and pull off resistance where the depth of the notches 52 is on the order of 0.015 to 0.020". Notches 52 are formed so that the crest of the biting edge 50 lies on the radial centerline through the projection 34. However, the notches can be formed of slightly larger extend in a circumferential direction so that the crests of the biting edges 50 are located slightly rearwardly of the radial centerline through projections 34, in which event the radially outermost peripheral portion of the return bend 40 is removed. This is illustrated by the broken line 58 in FIG. 5. In other words, in accordance with the present invention it is essential that the radially outermost portion of each projection 34 is defined by a portion of the biting edge 50 rather than a surface portion of the return bend 40.

We claim:

1. In a wheel cover of the type having a circumferentially resilient wire ring mounted on the inner side of the wheel cover body, the wire ring having a plurality of at least three generally equally circumferentially spaced U-shaped projections extending radially outwardly through and beyond radial guideways on the cover for interengaging an annular surface on the vehicle wheel when the cover is applied thereto, the radially outer ends of said projections comprising rounded bight portions, that improvement which comprises means forming a sharp radially outwardly extending biting face at the central portion of the radially outer side of at least two of said rounded bight portions, said biting edge faces being inclined at an acute angle to both a plane perpendicular to the axis of the cover and a central radial plane extending through the bight portion and the axis of the cover, the biting edge face on one of said projections being inclined to said perpendicular plane in a direction opposite to the inclination of the biting edge face on another projection.

2. The improvement called for in claim 1 wherein said biting edge faces are inclined to said radial plane at an angle of about 15°.

3. The improvement called for in claim 1 wherein said wire is round in cross section and each biting edge face is defined by the line intersection between a radially outer circumferential surface segment of the wire and a segment of a generally radially extending chordal surface through the wire.

4. The improvement called for in claim 3 wherein the radial dimension of each biting edge face is less than one-half the wire diameter.

5. The improvement called for in claim 1 wherein the radially outermost portion of each projection is notched in a direction generally parallel to the axis of the wheel cover, said biting edge face forming one side of said notch, the other side of said notch comprising a plane surface substantially perpendicular to said radial plane.

6. The improvement called for in claim 5 wherein said biting edge face is inclined to said plane surface at an acute angle slightly less than 90°.

7. The improvement called for in claim 5 wherein the radially outermost crest of said biting edge face lies substantially in said radial plane.

8. The improvement called for in claim 5 wherein the radially outermost crest of said biting edge face is displaced slightly circumferentially from said radial plane in a direction such that said radial plane extends through said notch.

* * * * *